(12) United States Patent
Takatsuka et al.

(10) Patent No.: US 7,508,376 B2
(45) Date of Patent: Mar. 24, 2009

(54) KEY SHEET FOR POINTING DEVICE AND POINTING DEVICE

(75) Inventors: Toshinori Takatsuka, Fuji (JP); Yoshifumi Honmatsu, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 872 days.

(21) Appl. No.: 11/138,436

(22) Filed: May 27, 2005

(65) Prior Publication Data

US 2005/0264530 A1 Dec. 1, 2005

(30) Foreign Application Priority Data

Jun. 1, 2004 (JP) ............... 2004-163736

(51) Int. Cl.
*G09G 5/08* (2006.01)
(52) U.S. Cl. .................... 345/160; 345/161
(58) Field of Classification Search ......... 345/156–172; 200/5, 61, 160, 205, 512–513, 302.2; 455/90, 455/414, 550; 335/205, 206, 207
See application file for complete search history.

(56) References Cited

U.S. PATENT DOCUMENTS

| | | | | |
|---|---|---|---|---|
| 7,126,072 | B2 * | 10/2006 | Saitoh | 200/512 |
| 7,262,374 | B2 * | 8/2007 | Takatsuka et al. | 200/5 A |
| 2002/0061735 | A1 * | 5/2002 | Wingett et al. | 455/90 |
| 2003/0178291 | A1 * | 9/2003 | Schilling | 200/6 R |
| 2004/0119687 | A1 * | 6/2004 | Suzuki et al. | 345/156 |

FOREIGN PATENT DOCUMENTS

| | | |
|---|---|---|
| JP | 04-172521 A1 | 6/1992 |
| JP | 06-035599 A1 | 2/1994 |
| JP | 06-318134 A1 | 11/1994 |
| JP | 08-152961 A1 | 6/1996 |
| JP | 08-185257 A1 | 7/1996 |
| JP | 09-034644 A1 | 2/1997 |
| JP | 09-128139 A1 | 5/1997 |
| JP | 2002-150904 A1 | 5/2002 |
| JP | 2004-031177 A1 | 1/2004 |
| JP | 2004-062447 A1 | 2/2004 |
| WO | WO-02/086694 A1 | 10/2002 |

* cited by examiner

*Primary Examiner*—Nitin Patel
(74) *Attorney, Agent, or Firm*—Cermak Kenealy Vaidya & Nakajima LLP; Tomoko Nakajima

(57) ABSTRACT

Provided is a pointing device that can be reduced in thickness even if a magnetic field sensor is mounted to a front face of a printed circuit board. When a support portion laterally moves, a reverse face of a flexible portion is displaced while being guided away from the printed circuit board due to deformation of a mountain fold flexure portion as a directional deformation portion. Therefore, a clearance between the reverse face of the flexible portion and the printed circuit board increases, and the magnetic field sensor can be mounted to the front face of the printed circuit board, thereby making it possible to reduce thickness of the pointing device. At the same time, the flexible portion would not be ruptured through sliding contact with the magnetic field sensor.

20 Claims, 11 Drawing Sheets

Fig.10
(A)
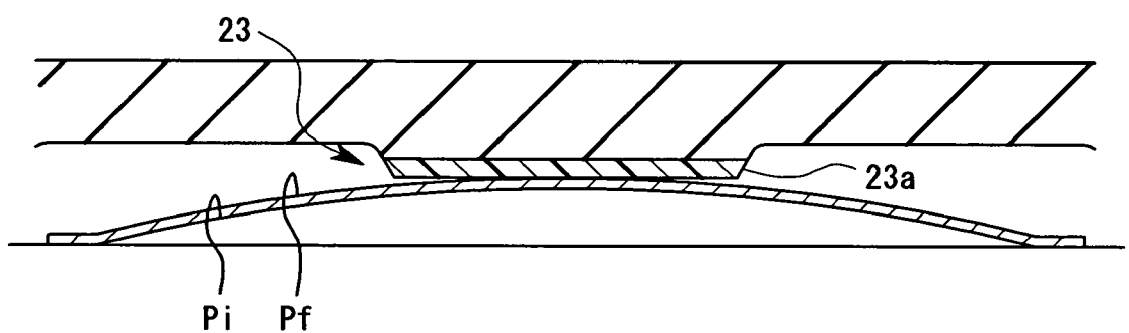
(B)
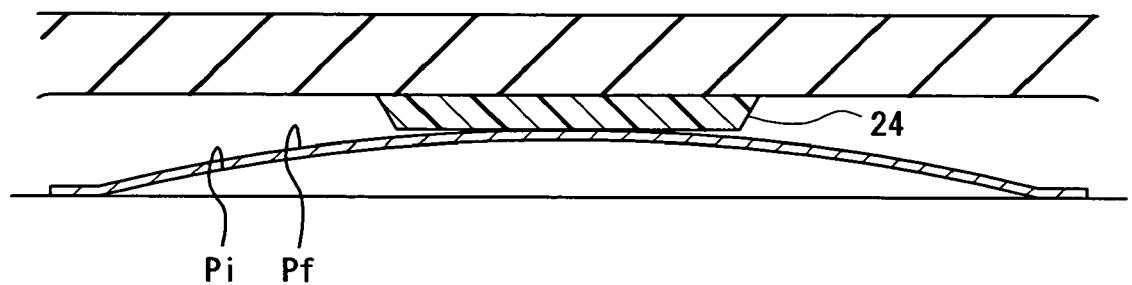

KEY SHEET FOR POINTING DEVICE AND POINTING DEVICE

BACKGROUND OF THE INVENTION

1. Field of the Invention

The present invention relates to a pointing device utilized as an operating device for an electronic device such as a mobile phone, a PDA, or a game controller, and relates to a key sheet for the pointing device. More particularly, the present invention relates to a pointing device of a magnetic field detection type which detects a change in magnetic flux density resulting from movements made by a magnet, and relates to a key sheet for the pointing device.

2. Description of the Related Arts

Operating devices for electronic devices and their input modes have been diversified. There has been known a pointing device of a magnetic field detection type which detects a change in magnetic flux density resulting from "a lateral movement" of a magnet such as a tilt or a horizontal displacement by means of a magnetic field sensor and utilizes the detected change as an input signal.

As an example of such a pointing device as described above, there has been known a pointing device in which a magnetic field sensor is mounted on a reverse face of a printed circuit board so that the magnetic field sensor and the pointing device do not interfere with each other (see JP 2000-235822 A, FIG. 7). However, this causes a problem in that a space is required for the magnetic field sensor on the reverse face of the printed circuit board to be mounted, that reduces mounting efficiency. In view of this, there has been known another pointing device in which a magnetic field sensor is mounted on a front face of a printed circuit board (see JP 2002-150904, FIGS. 4 and 5), by which the problem can be eliminated.

However, in the case where the magnetic field sensor is mounted on the front side of the printed circuit board, the following problem is caused. This will be described hereinafter with reference to the drawing.

A pointing device 1 shown in FIG. 11 includes a key top 2 exposed through a penetration hole Ch of a casing C of an electronic device such as a mobile phone, a magnet 3, a base sheet 4, and magnetic field sensors 5 such as Hall elements mounted on a printed circuit board P. The base sheet 4 is formed of a thick support portion 4a, a thin flexible portion 4b, and a fixation portion 4c for the printed circuit board P. The key top 2 and the magnet 3 are firmly fixed to the support portion 4a. As shown in FIGS. 11(A) and 11(B), when the key top 2 is operated to be moved laterally leftwards in the drawings, the magnet 3 laterally moves together with the support portion 4a due to expansive and contractive deformation of the flexible portion 4b, and changes magnetic flux density, which is to be detected by the magnetic field sensors 5.

In the case of this example, however, even if the magnetic field sensors 5 are located on the front face of the printed circuit board P but below the support portion 4a of the base sheet 4, the support portion 4a may slide into contact with the magnetic field sensors 5 at the time of a lateral movement to a state shown in FIG. 11(B). Thus, a rupture may occur in the support portion 4a, or mounting conditions of the magnetic field sensors 5 with respect to the printed circuit board P may be adversely affected through sliding contact with the support portion 4a. Accordingly, the clearance between the support portion 4a and the front face of the printed circuit board P must be set large. But there is a limit to a reduction in thickness of the pointing device 1 and a demand for size reduction of electronic devices cannot be satisfied.

SUMMARY OF THE INVENTION

The present invention has been made in view of the foregoing related arts. It is an object of the present invention to reduce a thickness of a pointing device.

In order to attain the above-mentioned object, therefore, the present invention provides a key sheet for a pointing device in which a change in magnetic flux density, which occurs as a magnet laterally moves, is detected by at least one magnetic field sensor provided on a printed circuit board, the key sheet being characterized by including a base sheet made of a rubber-like elastic body including; a support portion for supporting a magnet; a flexible portion that is laterally deformable to expand and contract so that the support portion can be laterally moved; and a directional deformation portion formed in the flexible portion, for guiding and displacing a reverse face of the flexible portion away from a front face of a printed circuit board as the support portion laterally moves.

In the present invention, when the support portion laterally moves, the reverse face of the flexible portion is displaced while being guided away from the front face of the printed circuit board due to deformation of the directional deformation portion. In other words, the clearance between the reverse face of the flexible portion and the front face of the printed circuit board increases. Accordingly, even if the magnetic field sensor is mounted on the front face of the printed circuit board, it need not be mounted below the support portion. In this respect, a limit to the reduction in thickness in the foregoing related arts is overcome, and first of all, the pointing device is reduced in thickness. Even if the magnetic field sensor is mounted below the flexible portion, the clearance is increased by the directional deformation portion on a lateral movement where the flexible portion contracts as described above. Therefore, the flexible portion would not be ruptured through sliding contact with the magnetic field sensor.

Thus, in the key sheet of the present invention, the flexible portion is not ruptured through sliding contact with the magnetic field sensor, so it is still impossible to prevent a rupture from occurring due to a deterioration resulting from excessive repetition of expansive deformation of the rubber-like elastic body constituting the base sheet. When the support portion is at an initial position before moving laterally or has moved laterally to its maximum, the flexible portion may be in contact with the magnetic field sensor.

The directional deformation portion guides and displaces the reverse face of the flexible portion away from the front face of the printed circuit board. In the present invention, the directional deformation portion is formed as a mountain fold flexure portion protruding away from the front face of the printed circuit board. A recess groove opening downwards may be formed as the directional deformation portion on a side facing the printed circuit board so that the flexible portion is guided to be flexed away from the front face of the printed circuit board.

The flexible portion of the present invention may be structured by forming at least one reverse face thereof as a face inclined upwards to the directional deformation portion side from the support portion side. Therefore, the flexible portion can be reliably prevented from sliding into contact with the magnetic field sensor when the support portion laterally moves.

The flexible portion of the present invention may be structured by increasing thickness thereof from the directional deformation portion side to the support portion side. Therefore, the side of the support portion is thick and unlikely to deform, so the directional deformation portion can be reliably deformed.

The magnet of the present invention may comprise one of an annular magnet and a plurality of magnet pieces that are disposed at annular positions. In this case, the magnet may be magnetized radially inwards and outwards. If the magnet is magnetized radially inwards and outwards, for example, if the annular magnet is magnetized such that its inner peripheral side serves as a south pole and its outer peripheral side serves as a north pole, the density of magnetic fluxes leaking outside can be reduced, and temperature characteristic can also be improved in comparison with a magnet that is magnetized in its thickness direction that is its upper side serves as a south pole and its lower side serves as a north pole, for example. In addition, the pointing device can be reduced in thickness. Moreover, by designing the magnetic field sensor to sense a magnetic field horizontally with respect to the printed circuit board, a change in magnetic flux caused by movements of the magnet can be sensed greatly.

The magnet of the present invention may be constructed as a plastic magnet. Thus, the magnet is reduced in thickness, thereby achieving the pointing device reduced in thickness.

The present invention is arranged such that the support portion has a magnet accommodating recess portion formed therein, and wherein the key sheet further comprises a key top for blocking the magnet accommodating recess portion, the key top being mounted on a front face of the support portion. Thus, the key top can reliably prevent the magnet from falling off from the magnet accommodating recess portion. Further, the magnet accommodating recess portion is formed not in the key top but in the support portion of the base sheet, a bottom face of the key top can be constructed as a flat face, and a printing layer for displaying letters, numerals, symbols, and the like can be formed in the bottom face. As a specific construction for mounting the key top for blocking the magnet accommodating recess portion on the front face of the support portion, the support portion and the key top may be firmly fixed to each other by interposing an adhesive layer therebetween. In this case, furthermore, it is possible to firmly fix not only the support portion and the key top but also the magnet in the magnet accommodating recess portion and the key top to each other by interposing an adhesive layer therebetween. This construction makes it possible to prevent the magnet accommodating recess portion of the base sheet made of a rubber-like elastic body from drooping due to a weight of the magnet.

The present invention may be arranged such that the base sheet is formed of a translucent rubber-like elastic body, that the key top is formed of a translucent resin having a main body portion and a flange portion provided at a lower end of the main body portion, and that the magnet accommodating recess portion is formed in the support portion at a position facing the flange portion. In this construction, light from an internal light source for light radiation can penetrate the translucent base sheet and the main body portion of the key top made of the translucent resin, so the magnet does not hamper a light radiation function. As a result, it is possible to construct the key sheet as a light radiation key sheet.

The present invention may be arranged such that the support portion is formed as a thin support portion having a penetration hole, that a lower key top made of a hard resin and an upper key top, which sandwich a front face and a reverse face of the support portion by firm fixation through the penetration hole, are provided, and that a magnet accommodating recess portion is formed in the lower key top. By forming the magnet accommodating recess portion in the lower key top, a portion facing the front face of the printed circuit board is not as the support portion of the base sheet made of the rubber-like elastic body but is the lower key top made of the hard resin. Thus, it is possible to completely eliminate a case where the magnet falls off due to abrasion or rupture of the support portion.

Further, in order to attain the above-mentioned object, the present invention provides a pointing device, characterized by including: a magnet; a base sheet made of a rubber-like elastic body and having a flexible portion that is laterally deformable to expand and contract so that a support portion for supporting the magnet can be laterally moved; and at least one magnetic field sensor that is provided on a printed circuit board and detects a change in magnetic flux density caused by the magnet moving laterally together with the support portion, wherein the base sheet has a directional deformation portion formed in the flexible portion, for guiding and displacing a reverse face of the flexible portion away from a front face of the printed circuit board as the support portion laterally moves.

According to the present invention, the clearance between the reverse face of the flexible portion and the front face of the printed circuit board is increased due to deformation of the directional deformation portion in the flexible portion of the base sheet. Therefore, even if the magnetic field sensor is mounted to the front face of the printed circuit board, it need not be mounted below the support portion, thereby attaining the pointing device reduced in thickness. Also, even if the magnetic field sensor is mounted below the flexible portion, the flexible portion is prevented from rupturing through sliding contact with the magnetic field sensor, due to an increase in clearance on a lateral movement where the flexible portion contracts.

The present invention is arranged such that the magnetic field sensor is provided on the front face of the printed circuit board at a position facing the directional deformation portion. In this construction, the magnetic field sensor is located not below the support portion but below the flexible portion, and the directional deformation portion is located above facing the magnetic field sensor. Therefore, while the magnetic field sensor is mounted on the front face of the printed circuit board, it is possible to attain the pointing device reduced in thickness without causing the base sheet to rupture through sliding contact.

The present invention is arranged such that the internal light source for light radiation is provided on the front face of the printed circuit board at a position facing the directional deformation portion. In this construction, the internal light source for light radiation is located not below the support portion but below the flexible portion, and the directional deformation portion is located above facing the internal light source for light radiation. Therefore, while the internal light source for light radiation is mounted on the front face of the printed circuit board, it is possible to attain the pointing device reduced in thickness and endowed with a light radiation function without causing the base sheet to rupture through sliding contact.

By additionally providing the respective components of the pointing device according to the present invention, namely, the base sheet, the support portion for the base sheet, the magnet, and the key top with a key sheet for the pointing device according to the present invention and its components, the same operation and effect as those of the key sheet and its components can be achieved.

According to the pointing device of the present invention and the key sheet for the pointing device, the directional deformation portion is formed in the flexible portion of the base sheet in the key sheet, which leads to a reduction in thickness of the pointing device as a whole. As a result, the pointing device can also be installed in a portable device such as a mobile phone or a PDA, which has been ardently demanded to be reduced in size and thickness, and various input operations including the scrolling on a display screen and the entry of coordinates can be realized.

The contents of the present invention should not be limited to the foregoing description. The objects, advantages, features, uses of the present invention will be made more apparent by the following description that will be given with reference to the accompanying drawings. It should also be understood that all suitable modifications are included in the scope of the present invention as long as they do not depart from the spirit thereof.

BRIEF DESCRIPTION OF THE DRAWINGS

In the accompanying drawings:

FIGS. 3(A) and 3(B), is a view explaining how the pointing device shown in FIG. 1 operates;

FIG. 10, having FIGS. 10(A) and 10(B), is a partially enlarged sectional view of a pressing element and a contact belleville spring according to a modification example; FIGS. 11(A) and 11(B), is a sectional view of a pointing device according to one conventional example.

DETAILED DESCRIPTION OF THE PREFERRED EMBODIMENTS

Embodiments of the present invention will be described hereinafter with reference to the drawings.

Figure 1:
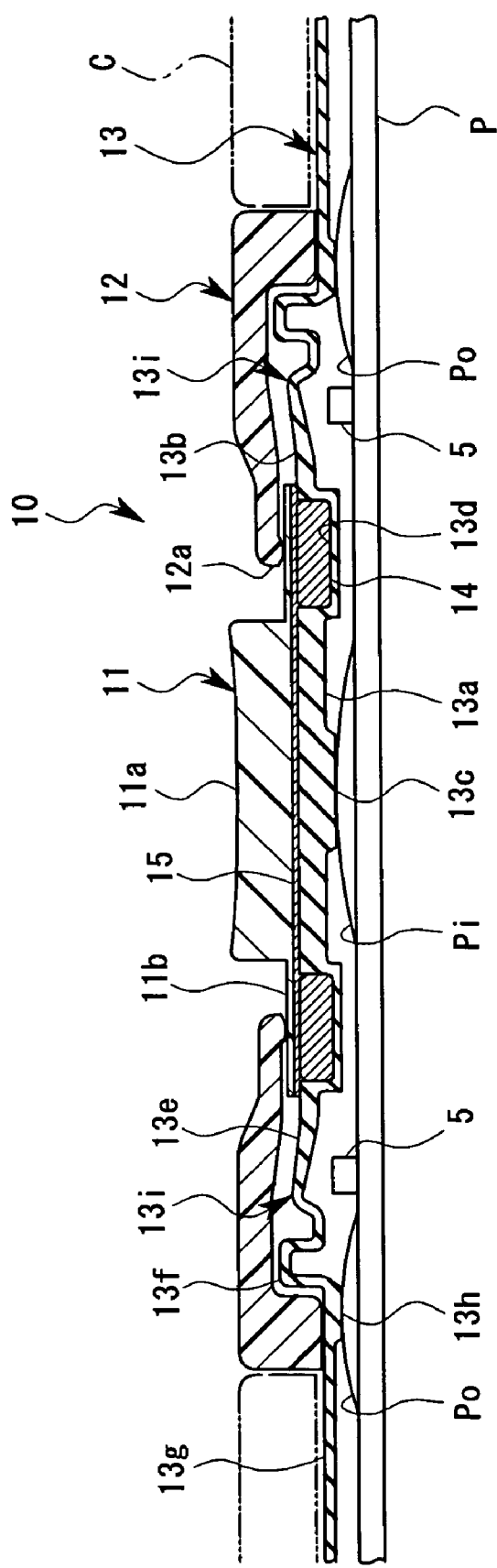
FIG. 1 is a sectional view of a pointing device according to a first embodiment of the present invention.
Figure 2:
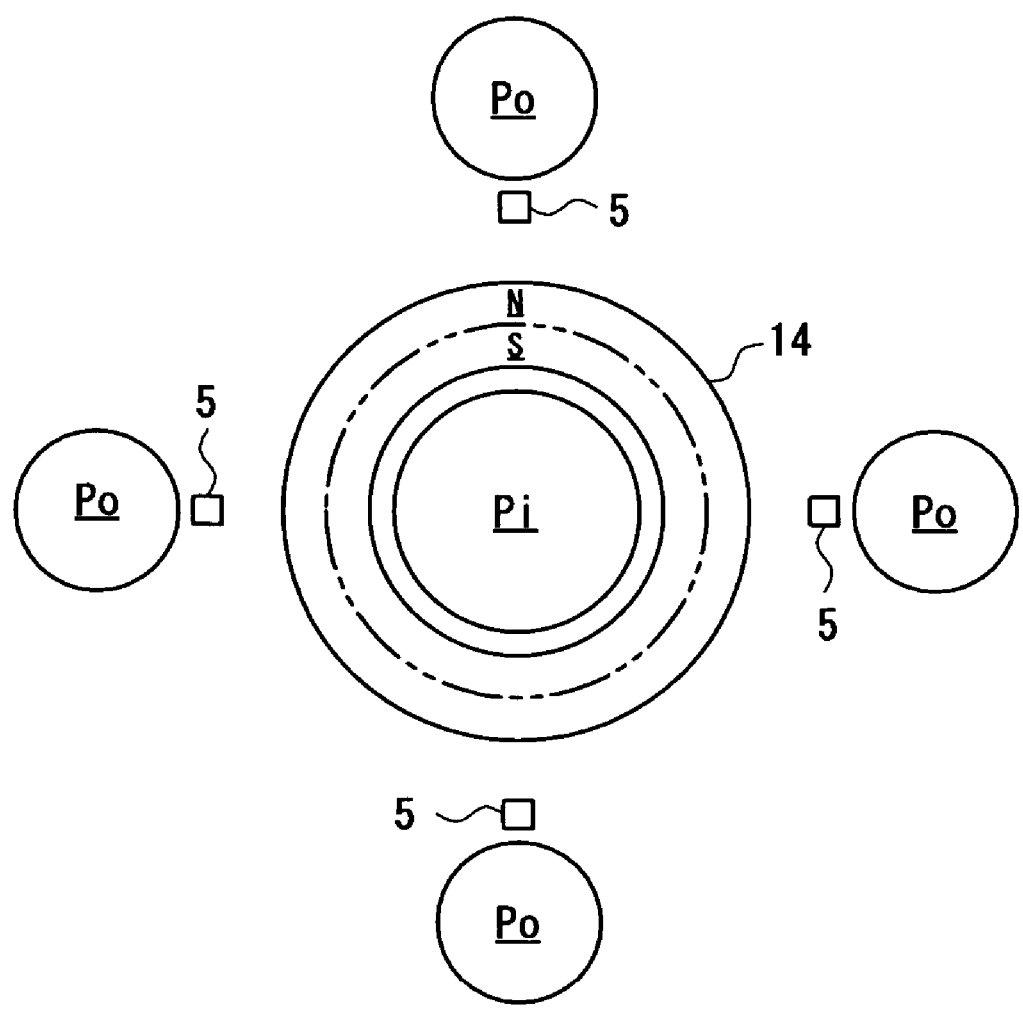
FIG. 2 is a schematic plan view showing a relationship in arrangement among a magnet, magnetic field sensors on a printed circuit board, and contact belleville springs.
Figure 3:
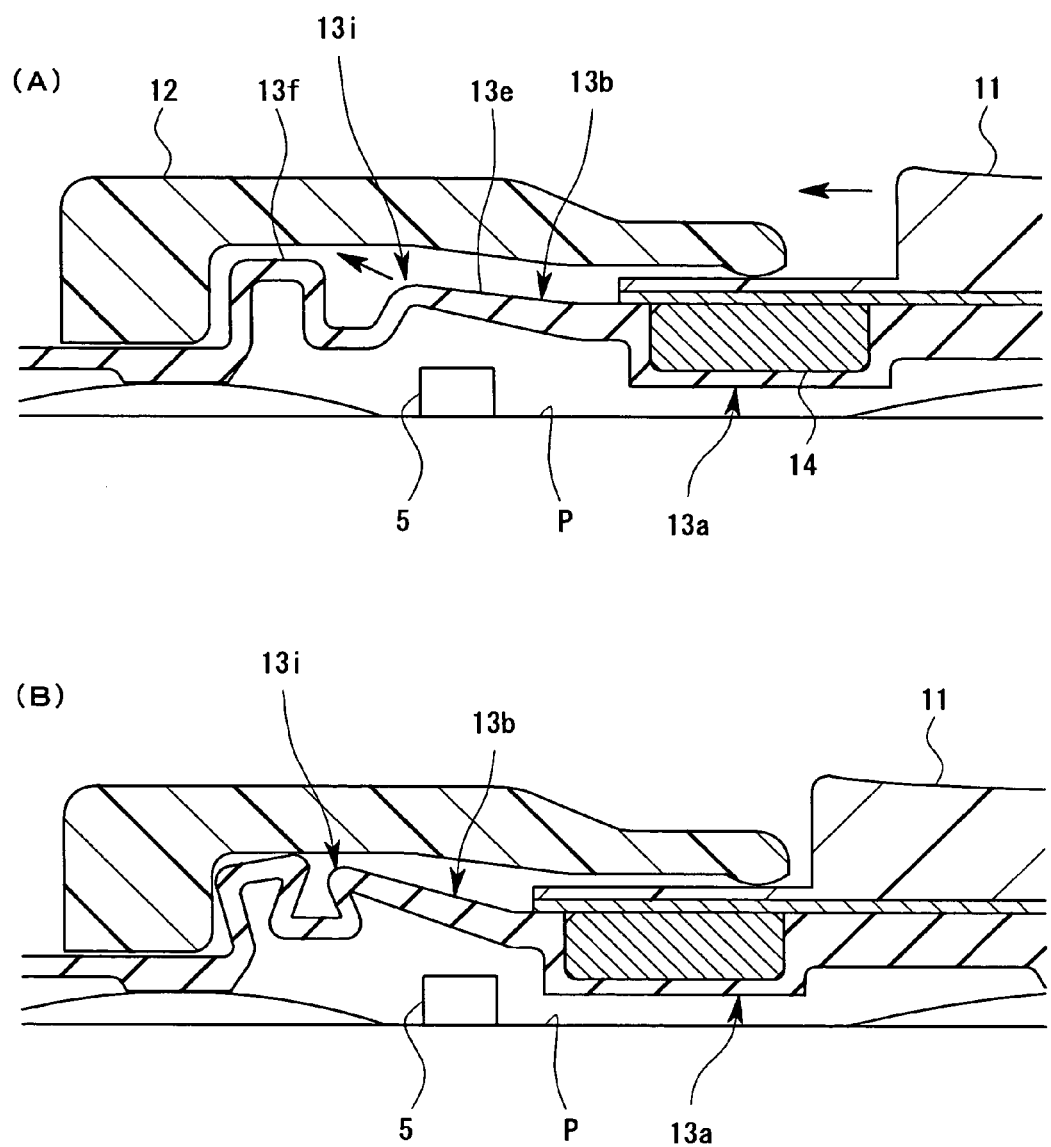
FIG. 3, having

First Embodiment [FIGS. 1 to 3]

A pointing device 10 of this embodiment is composed of a central key top 11, an outer peripheral key top 12, a base sheet 13, an annular magnet 14, and magnetic field sensors 5 mounted on a printed circuit board P. A key sheet is constructed of the remaining construction except the magnetic field sensors 5.

The central key top 11 is formed of a columnar main body portion 11a and a circular flange portion 11b. The central key top 11 being made of a hard resin including an elastomer is within the scope of the invention. The central key top 11 being of a metal or being of another suitable material is also within the scope of the invention. The outer peripheral key top 12 is circularly formed with a penetration hole 12a for exposing the central key top 11. The outer peripheral key top 12 being made of a hard resin including an elastomer is within the scope of the invention. The outer peripheral key top 12 being of a metal or being of another suitable material is also within the scope of the invention. The central key top 11 is movable in all directions by 360° within an extending range of the penetration hole 12a.

The central key top 11 is firmly fixed to the base sheet 13 via an adhesive layer 15. Similarly, the outer peripheral key top 12 is also firmly fixed to the base sheet 13 via an adhesive layer (not shown). The base sheet 13 is formed of a thick columnar support portion 13a supporting the central key top 11 and the annular magnet 14 and a flexible portion 13b surrounding an outer periphery of the support portion 13a.

A pressing element 13c is formed at a center of the support portion 13a. Thus, when the central key top 11 is operated to be pressed, the pressing element 13c buckles a contact belleville spring Pi on the printed circuit board P and thus enables switch input. A magnet accommodating recess portion 13d for the annular magnet 14 is formed in the support portion 13a. Thus, the magnet accommodating recess portion 13d is sealed by the flange portion 11b of the central key top 11 via the adhesive layer 15, whereby the annular magnet 14 is prevented from falling off.

The flexible portion 13b is composed of an upward inclined face portion 13e, an undulated bellows portion 13f, and a flat portion 13g, which are arranged in this order from an inner periphery side.

The upward inclined face portion 13e is formed to be thick on its root side for the support portion 13a and made thinner as it spreads outwards. For this reason, the upward inclined face portion 13e is relatively hard to deform on its thick root side and is more likely to deform as it spreads outwards. As the upward inclined face portion 13e spreads outwards from its root side, it is inclined upwards and the distance from the printed circuit board P increases. Therefore, the upward inclined face portion 13e is spaced apart from the magnetic field sensors 5 as in a state shown in FIG. 1.

The bellows portion 13f is formed by being flexed outwards in a multistage manner from an outer peripheral upper end of the inclined face portion 13e. Owing to this multistage flexure, the bellows portion 13f can expand and contract in accordance with lateral movements of the central key top 11. A force causing the laterally moved central key top 11 to return to its initial position is mainly given by the bellows portion 13f.

The flat portion 13g is formed horizontally from a lower end of the bellows portion 13f. Pressing elements 13h are formed in the flat portion 13g as well. When the outer peripheral key top 12 is operated to be pressed, the pressing elements 13h buckle contact belleville springs Po and thus enable switch input.

A plastic magnet 14, which is obtained by filling a binder resin with a powder from the group comprising an Alnico magnet, a ferrite magnet, a Sm—Co magnet, a Nd—Fe—B magnet, or the like is utilized as the annular magnet 14. Accordingly, the annular magnet 14 is thin and contributes toward reducing the thickness of the entire pointing device 10. As shown in FIG. 2, the annular magnet 14 is magnetized in its outer peripheral portion as a north pole and in its inner peripheral portion as a south pole. Since the annular magnet 14 is thus magnetized radially inwards and outwards, the density of magnetic fluxes leaking outside can be reduced in comparison with a case where the annular magnet 14 is magnetized in its thickness direction. Further, since the direction in which the annular magnet 14 is magnetized coincides with the moving direction of the laterally moved central key top 11, the accuracy in detecting magnetic flux densities in the magnetic field sensors 5 can also be enhanced. Furthermore, the magnetic characteristic of the annular magnet 14 in a high temperature range can be stabilized.

Specifically, Hall elements, Hall integrated circuits (ICs), magnetoresistive elements (MR), magnetoresistive ICs (MRICs), and the like can be utilized as the magnetic field sensors 5. Further, the magnetic field sensors 5, which detect the magnetic flux density whose direction coincides with magnetized direction of the magnet, is preferable. As shown in FIG. 2, the magnetic field sensors 5 are disposed inside the contact belleville springs Po, which are arranged at upper, lower, left, and right positions respectively.

Next, an operation and an effect of the foregoing pointing device 10 will be described.

As described above, the upward inclined face portion 13e and the bellows portion 13f are formed in the flexible portion 13b of the base sheet 11. The joint part between the upward inclined face portion 13e and the bellows portion 13f functions to produce a mountain fold flexure portion 13i, which is "a directional deformation portion" protruding away from a front face of the printed circuit board P. In other words, when the central key top 11 is moved laterally, as shown in FIG. 3(A), the support portion 13a and the flexible portion 13b is also laterally moved. And as shown in FIG. 3(B), the flexible portion 13b is guided and displaced away from the front face of the printed circuit board P in response to diagonally upward deformation in the mountain fold flexure portion 13i. Thus, since the magnetic field sensors 5 are not mounted to the reverse face of the printed circuit board P below the support portion 13a, the pointing device 10 can be reduced in thickness. Even if the magnetic field sensors 5 are mounted to the printed circuit board P below the flexible portion 13b, the clearance between the flexible portion 13b and the printed circuit board P is increased, and the flexible portion 13b can be prevented from sliding into contact with the magnetic field sensors 5, so that a rupture resulting from sliding contact can be obviated. As a result, the pointing device 10 can also be installed in a portable device such as a mobile phone or a PDA, which has been ardently demanded to be reduced in size and thickness, and diversified input operations including the scrolling on a display screen and the entry of coordinates, and the like can be realized.

On the side of expansive deformation, namely, opposite the side of contractive deformation shown in FIG. 3, a clearance is set in advance between the lower end of the bellows portion 13f and the magnetic field sensors 5. Therefore, the bellows portion 13f that has expansively deformed can be prevented from coming into contact with the magnetic field sensors 5.

The inclined face portion 13e of the flexible portion 13b deforming as described above is unlikely to deform on the thick root side for the support portion 13a and is more likely to deform as it spreads outwards. Thus, by laterally moving the central key top 11, the inclined face portion 13e is prevented from unexpectedly deforming in a buckling manner from the root side and can be reliably guided and displaced with respect to the flexible portion 13b. Even when the inclined face portion 13e has expanded on the expansive deformation side due to a lateral movement of the central key top 11, it is unlikely to deform on the thick root side and remains inclined, so that the inclined face portion 13e and the bellows portion 13f can be restrained from approaching the magnetic field sensors 5 and thus can also be prevented from coming into contact with the magnetic field sensors 5.

Figure 4:
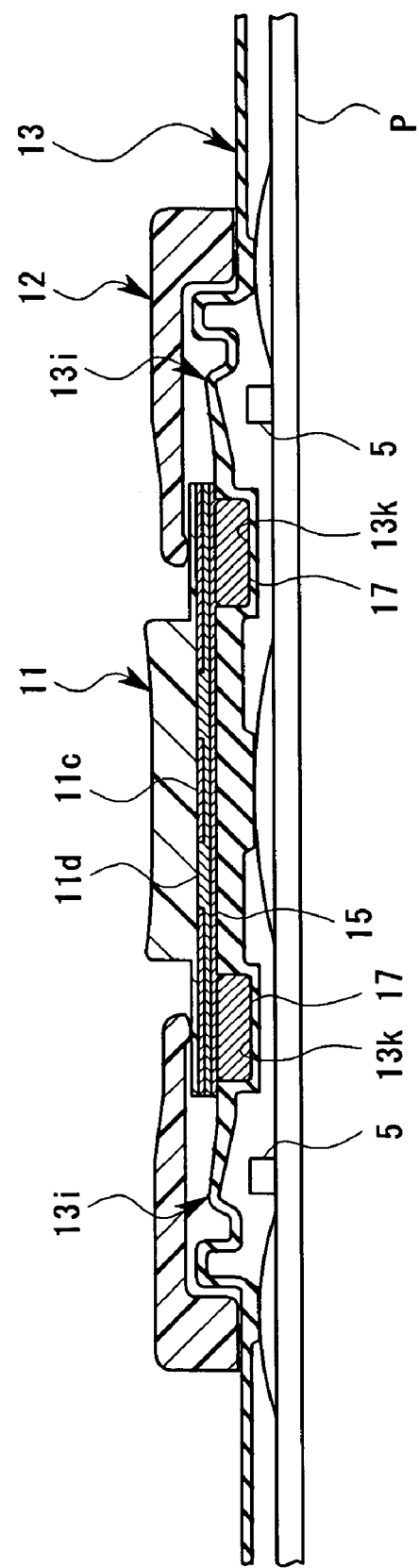
FIG. 4 is a sectional view of a pointing device according to a second embodiment of the present invention.
Figure 5:
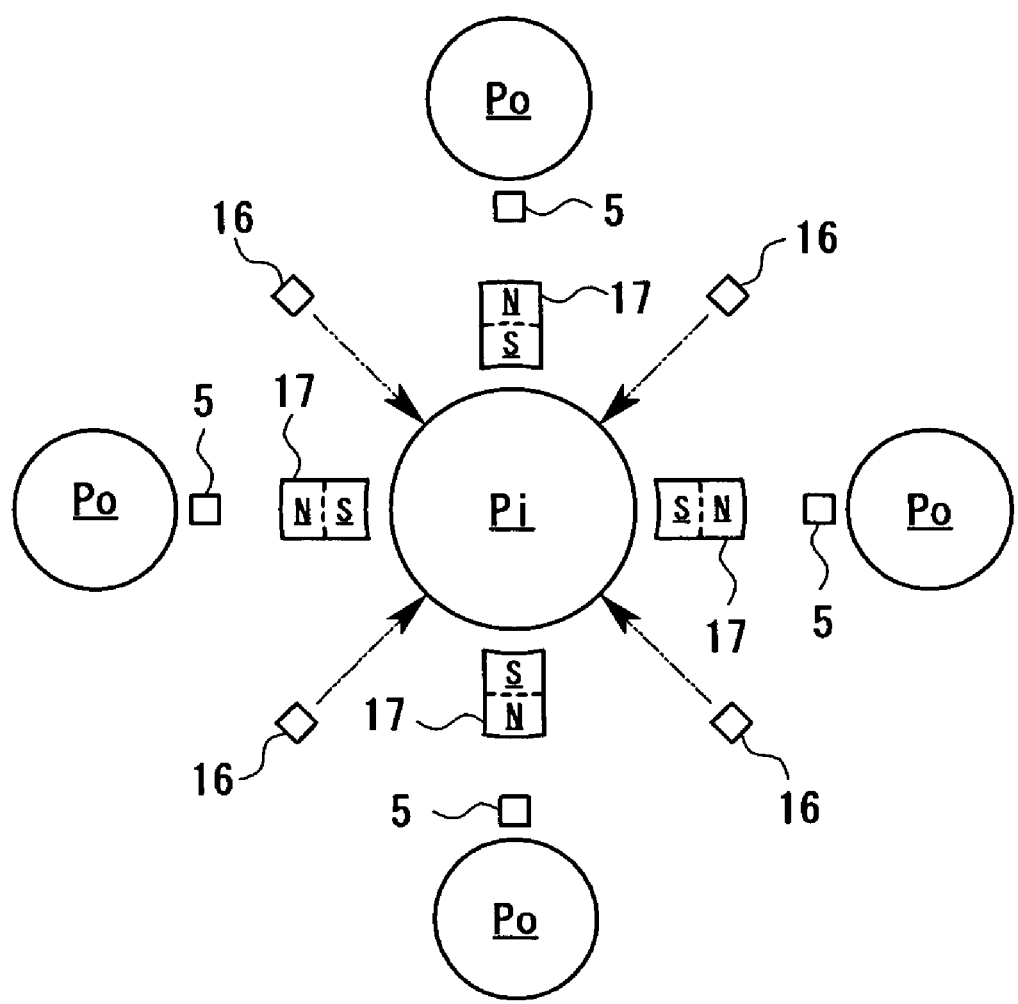
FIG. 5 is a schematic plan view showing a relationship in arrangement among magnet pieces, magnetic field sensors on a printed circuit board, internal light sources for light radiation, and contact belleville springs.

Second Embodiment [FIGS. 4 and 5]

The pointing device 10 according to this embodiment is different from the pointing device 10 according to the first embodiment in that a construction for realizing a light radiation function is added to the central key top 11.

A first specific difference is that the central key top 11 is made of a transparent hard resin. A second specific difference is that the adhesive layer 15 is made of a translucent adhesive. A third specific difference is that the base sheet 12 is made of a translucent rubber-like elastic body. A fourth specific difference is that a drawn-out character printed layer 11c representing letters, numbers, symbols, or the like and a colored layer 11d including a white color and a metallic color to fill a drawn-out character portion of the drawn-out character printed layer 11c are formed on a bottom face of the central key top 11. A fifth specific difference is that the printed circuit board P is provided with internal light sources 16 for light radiation such as LED's as shown in FIG. 5. Furthermore, a sixth specific difference is that a plurality of magnet pieces 17 are arranged facing the magnetic field sensors 5 respectively as shown in FIG. 5 unlike the annular magnet 14 of the first embodiment and that circumferentially separated magnet accommodating recess portions 13k corresponding to the magnet pieces 17 respectively are formed in the base sheet 13.

By adding the foregoing construction to the pointing device 10 of the first embodiment, in addition to the operation and effect as described in the first embodiment, light from the internal light sources 16 can be radiated through the base sheet 13, the adhesive layer 15, the colored layer 11d, the drawn-out character printed layer 11c, and the central key top 11.

The magnet pieces 17 are separated from one another, unlike the endless annular magnet 14 of the first embodiment. Therefore, as indicated by arrows in FIG. 5, spaces between the adjacent magnet pieces 17 on the base sheet 13 can be used as light paths. Thus, bright radiation of light is made possible.

In addition, the internal light sources 16 are disposed at the same circumferential positions as the magnetic field sensors 5 respectively. Thus, when the central key top 11 laterally moves, the flexible portion 13b is prevented from rupturing through sliding contact with the internal light sources 16.

Figure 6:
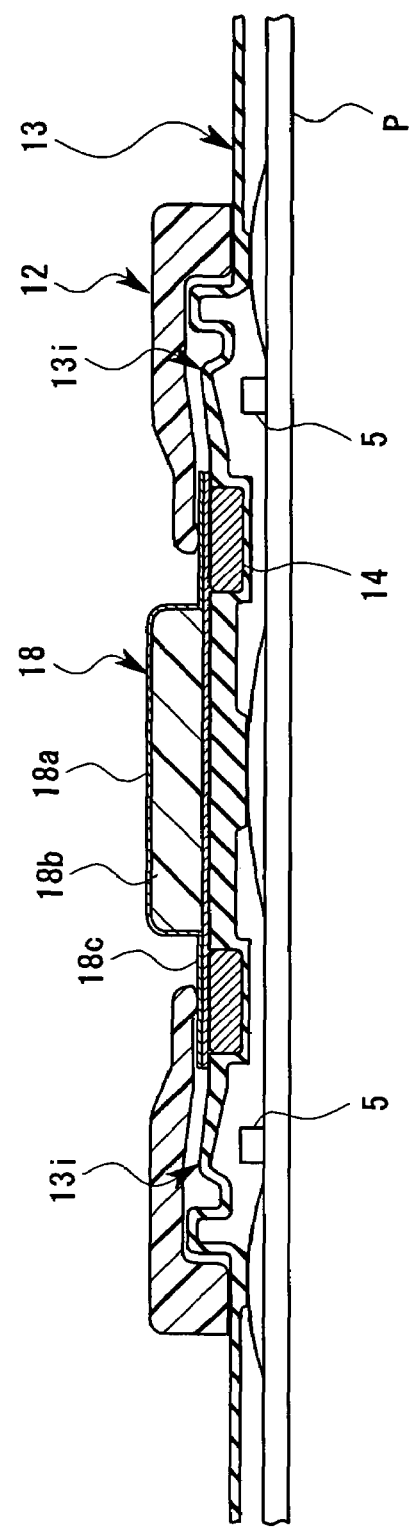
FIG. 6 is a sectional view of a pointing device according to a third embodiment of the present invention.

Third Embodiment [FIG. 6]

This embodiment is identical in construction to the first embodiment except in that a central key top 18 is different in construction from that of the pointing device 10 of the first embodiment. In other words, the central key top 18 of the third embodiment is obtained by molding a main body portion 18b made of a hard resin integrally with a resin film 18a. Thus, the central key top 18, which is a key top integrated with a film, is advantageous in that the thickness of a flange portion 18c of the resin film 18a can be made equal to or smaller than 0.3 mm and a further reduction in thickness can be achieved. Besides, despite a reduction in thickness, no inconvenience such as breakage of the flange portion 18c results.

Figure 7:
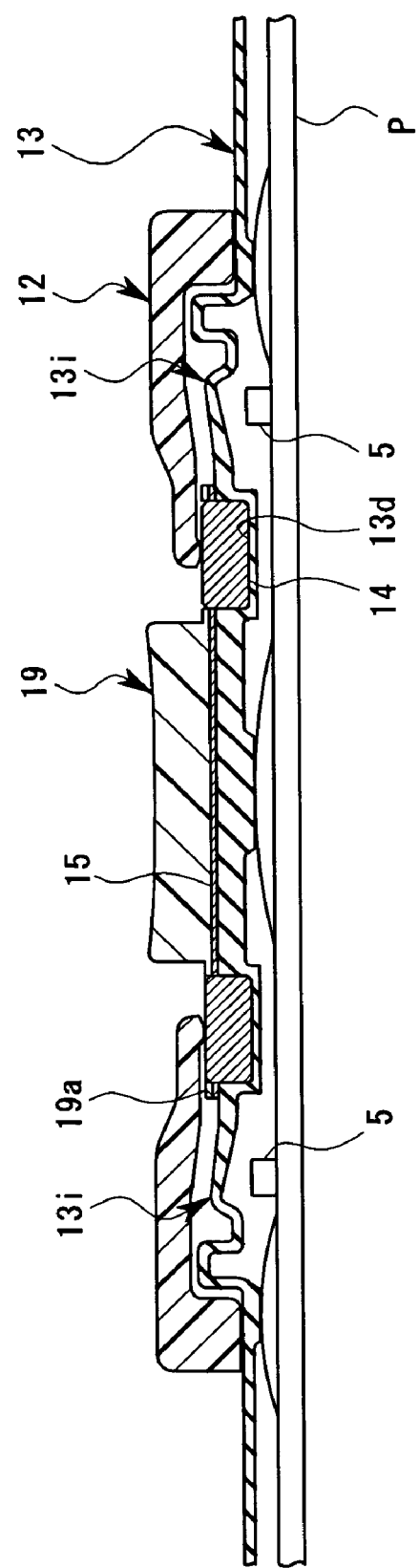
FIG. 7 is a sectional view of a pointing device according to a fourth embodiment of the present invention.

Fourth Embodiment [FIG. 7]

The pointing device of this embodiment is different from the pointing device 10 of the first embodiment in that the annular magnet 14 is molded integrally with a flange portion 19a of a central key top 19. According to this construction, the central key top 19 and the annular magnet 14 constitute a single molded body. In a process of adhesion to the base sheet 13, therefore, the annular magnet 14 is made to function as a positioning protrusion and is accommodated in the magnet accommodating recess portion 13d, whereby positioning accuracy can be enhanced. This construction can also contribute toward achieving a further reduction in thickness corresponding to the thickness of the flange portion 19a.

Figure 8:
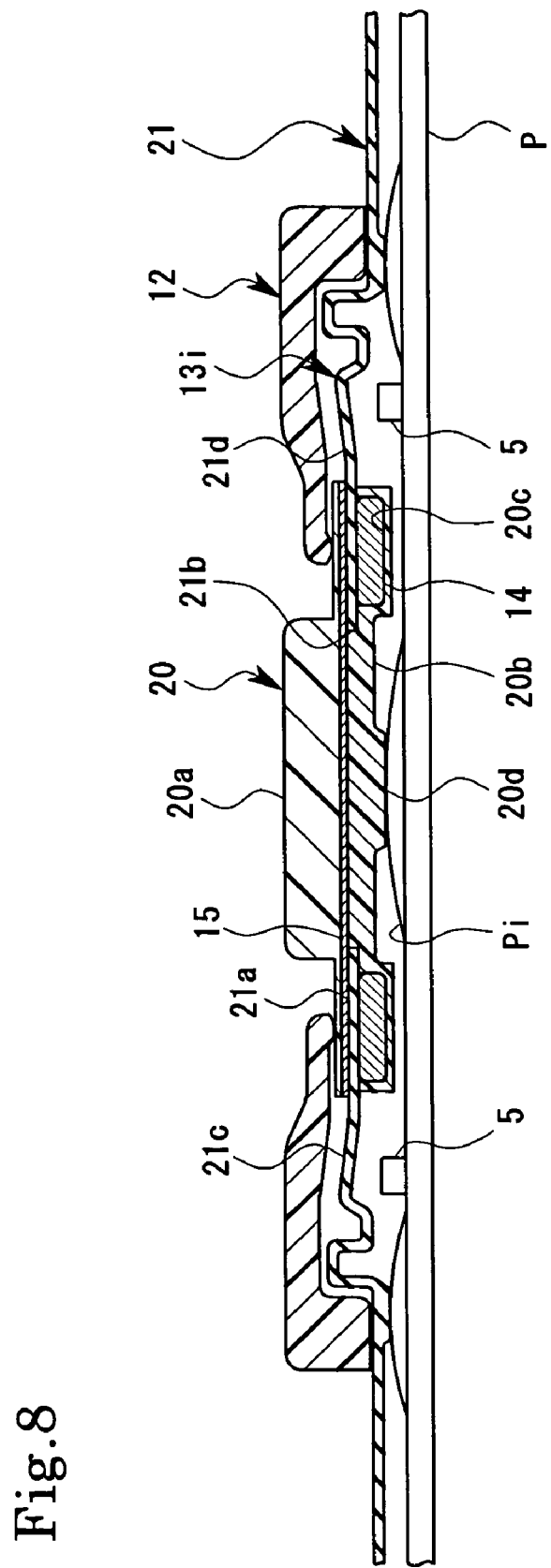
FIG. 8 is a sectional view of a pointing device according to a fifth embodiment of the present invention.

Fifth Embodiment [FIG. 8]

In this embodiment, a central key top 20 and a base sheet 21 are different from those of the pointing device 10 of the first embodiment.

In other words, in the base sheet 21 of this embodiment, a support portion 21a is formed thinly with a penetration hole 21b, and an inclined face portion 21d in a flexible portion 21c is formed thinly with an equal thickness. The central key top 20 of this embodiment is composed of an upper key top 20a and a lower key top 20b, which sandwich the thin support portion 21a from its front and reverse sides and are both made of a hard resin. A magnet accommodating recess portion 20c for the annular magnet 14 is formed in the lower key top 20b.

In addition to the same operation and effect as those of the first embodiment, according to this construction, a portion that faces the printed circuit board P is not, for example, the base sheet 13 made of the rubber-like elastic body as in the case of the first embodiment, but the lower key top 20b made of the hard resin. Thus, even if the central key top 20 slides into contact with the printed circuit board P in moving laterally, it is possible to eliminate such an inconvenience that the annular magnet 14 falls off due to a rupture of the accommodation recess 20c. When the central key top 20 laterally moves, a pressing element 20d of the lower key top 20b slides into contact with the metal contact belleville spring Pi, which leads to an advantage in performing smooth lateral movements. The pressing element 20d is made of the hard resin having a smaller friction coefficient than that of the rubber-like elastic body.

Figure 9:
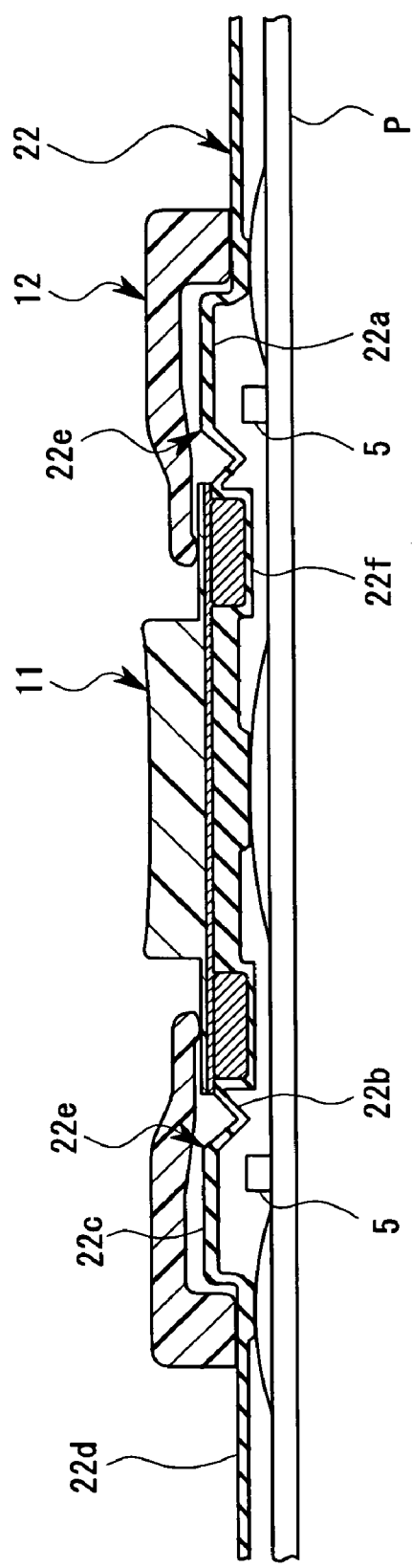
FIG. 9 is a sectional view of a pointing device according to a sixth embodiment of the present invention.
Figure 11:
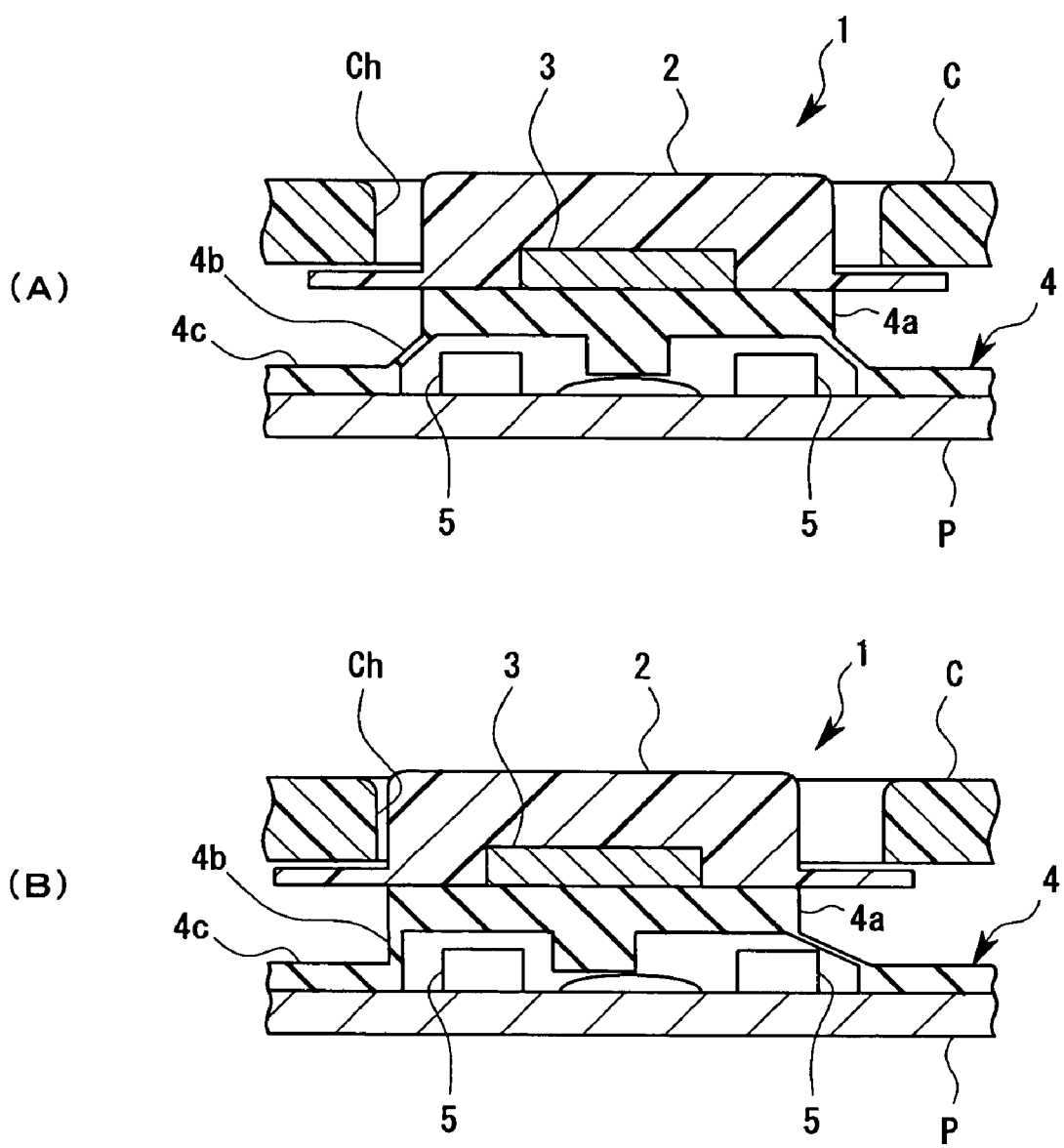
FIG. 11, having

Sixth Embodiment [FIG. 9]

A base sheet 22 of this embodiment has a construction different from that of the base sheet 13 of the first embodiment. In other words, a flexible portion 22a of the base sheet 22 is composed of a V-shaped flexure portion 22b having a V-shaped cross section, an inner flat portion 22c, and an outer flat portion 22d. In this embodiment, a boundary portion 22e across which the V-shaped flexure portion 22b and the inner flat portion 22c continuously extend from each other functions as "the directional deformation portion". More specifically, when the central key top 11 is laterally moved, the V-shaped flexure portion 22b deforms in a crushing manner while being urged by a support portion 22f. The boundary portion 22e deforms upwards in this process, whereby a reverse face of the flexible portion 22a is guided and displaced away from the front face of the printed circuit board P. This also makes it possible to achieve the same operation and effect as those produced by the mountain fold flexure portion 13i of the first embodiment.

Detailed Modification Examples of Respective Embodiments

In the foregoing embodiments, for example, operating protrusions corresponding to the central key top 11 and the outer peripheral key top 12 may be formed on the base sheet 13.

In the foregoing embodiments, the outer peripheral key top 12 may be circumferentially divided. Also, a pointing device having only the central key top 11, dispensing with the outer peripheral key top 12, can also be constructed. In this case, the pointing device may be so constructed as to enable an input operation in all directions of 360° or in a specific direction, and the number and arrangement of the magnetic field sensors 5 may be changed accordingly.

In the foregoing embodiments, the construction specific to each of them can also be applied to the other ones. For instance, the drawn-out character printed layer 11c and the colored layer 11d of the second embodiment may also be applied to any other embodiment. The drawn-out character printed layer 11c may be replaced with a character printed layer and a colored layer.

In the foregoing embodiments, for example, a thermosetting elastomer such as silicone rubber or a thermoplastic elastomer such as a styrene-based substance can be used as the rubber-like elastic body constituting the base sheet 13. For instance, if a thermoplastic elastomer is selected as the base sheet 13 and a thermoplastic resin is selected as the central key top 11, integral molding is made possible by co-injection molding, without requiring an adhesion process, and ensuring a great fixing strength.

In the examples shown in the foregoing embodiments, the annular magnet 14 is formed of a plastic magnet. However, other types of magnet can be employed as well.

In the examples shown in the foregoing embodiments, the magnetic field sensors 5 are disposed between the contact belleville spring Pi and the contact belleville springs Po respectively. Referring to FIG. 2, for example, if the magnetic field sensors 5 are offset by 45° around the contact belleville spring Pi, the magnetic field sensors 5 can be disposed among the contact belleville springs Po respectively, thereby making it possible to attain reduction in size. Referring to FIG. 5, the magnetic field sensors 5 and the internal light sources 16 can also be offset by 30° around the contact belleville spring Pi to be disposed among the contact belleville springs Po respectively. In this case, it is appropriate that the magnet pieces 17 are disposed to positions facing the magnetic field sensors 5 respectively.

In the examples shown in the first to fourth and sixth embodiments, the pressing element (indicated by 13c in FIG. 1) is formed as the rubber-like elastic body as a whole. In order to ensure smoother lateral movements, constructions shown in FIG. 10 may be adopted. FIG. 10(A) shows an example in which a pressing element 23 is provided with a leading end portion 23a made of a hard resin. FIG. 10(B) shows an example in which a pressing element 24 made of a hard resin is provided on the reverse face of the base sheet. According to these constructions, abrasion resistances higher than those of the pressing elements made of the rubber-like elastic bodies in the respective embodiments are achieved, and the degree of hook caused by sliding friction can be reduced. As a result, smooth lateral movements can be made. In addition to these effects, according to each of the examples shown in FIG. 10, a resin film Pf is firmly fixed through attachment or adhesion in such a manner as to cover the metal contact belleville spring Pi. A resin film made of a fluorocarbon resin, a polyamide resin, or the like, which exhibits abrasion resistance and has a low friction coefficient, may be utilized as the resin film Pf. By mounting the above-mentioned resin film Pf to the contact belleville spring Pi, the degree of hook caused by sliding friction is further reduced, thereby reliably performing smoother lateral movements. With a view towards improving abrasion resistance and reducing sliding friction, the constructions shown in FIG. 10 are the most favorable. However, it is also possible to adopt another construction by either forming the leading end portion 23a and the pressing element 24, or mounting the resin film Pf.

In the example shown in the second embodiment, only the central key top 11 is endowed with the light radiation function. It is also possible to adopt a construction in which the outer peripheral key top 12 is made of a translucent resin and endowed with the light radiation function, through which light from the internal light sources 16 can be radiated.

In the example of the central key top 18 shown in the third embodiment, the resin film 18a is formed integrally with upper and lateral faces of the main body portion 18b. However, a resin film that is greater in width by a width of the flange portion may be formed integrally with a bottom face of the main body portion 18b.

What is claimed is:

1. A key sheet for a pointing device in which a change in magnetic flux density, which occurs as a magnet laterally moves, is detected by at least one magnetic field sensor provided on a printed circuit board, the key sheet comprising a base sheet made of a rubber-like elastic body, comprising:
a support portion for supporting a magnet;
a flexible portion that is laterally deformable to expand and contract so that the support portion can be laterally moved; and
a directional deformation portion formed in the flexible portion, for guiding and displacing a reverse face of the flexible portion away from a front face of a printed circuit board as the support portion laterally moves.

2. A key sheet for a pointing device according to claim 1, wherein the directional deformation portion is formed as a mountain fold flexure portion protruding away from the front face of the printed circuit board.

3. A key sheet for a pointing device according to claim 1, wherein at least the reverse face of the flexible portion is formed as a face inclined upward to a directional deformation portion side from a support portion side.

4. A key sheet for a pointing device according to claim 1, wherein the flexible portion is formed such that a thickness thereof increases from the directional deformation portion side to the support portion side.

5. A key sheet for a pointing device according to claim 1, wherein the magnet comprises one of an annular magnet and a plurality of magnet pieces that are disposed at annular positions, and wherein the magnet is magnetized radially inwards and outwards.

6. A key sheet for a pointing device according to claim 1, wherein the magnet comprises a plastic magnet.

7. A key sheet for a pointing device according to claim 1, wherein the support portion has a magnet accommodating recess portion, formed therein, and wherein the key sheet further comprises a key top for blocking the magnet accommodating recess portion, the key top being mounted to a front face of the support portion.

8. A key sheet for a pointing device according to claim 7, wherein the base sheet is formed of a translucent rubber-like elastic body, wherein the key top is formed of a translucent resin having a main body portion and a flange portion provided at a lower end of the main body portion, and wherein the magnet accommodating recess portion is formed at a position facing the flange portion in the support portion.

9. A key sheet for a pointing device according to claim 1, wherein the support portion is formed as a thin support portion having a penetration hole, wherein the key sheet further comprises an upper key top and a lower key top that sandwich a front face and a reverse face of the support portion by firm fixation through the penetration hole, and wherein the magnet accommodating recess portion is formed in the lower key top.

10. A pointing device, comprising:
a magnet;
a base sheet made of a rubber-like elastic body and having a flexible portion that is laterally deformable to expand and contract so that a support portion for supporting the magnet can be laterally moved; and
at least one magnetic field sensor that is provided on a printed circuit board and detects a change in magnetic flux density caused by the magnet moving laterally together with the support portion,
wherein the base sheet has a directional deformation portion formed in the flexible portion, which guides and displaces a reverse face of the flexible portion away from a front face of the printed circuit board as the support portion laterally moves.

11. A pointing device according to claim 10, wherein the magnetic field sensor is provided on the front face of the printed circuit board at a position facing the directional deformation portion.

12. A pointing device according to claim 10, further comprising an internal light source for light radiation provided on the front face of the printed circuit board at a position facing the directional deformation portion.

13. A pointing device according to claim 10, wherein the directional deformation portion is formed as a mountain fold flexure portion protruding away from the front face of the printed circuit board.

14. A pointing device according to claim 10, wherein at least the reverse face of the flexible portion is formed as a face inclined upward to a directional deformation portion side from a the support portion side.

15. A pointing device according to claim 10, wherein the flexible portion is formed such that a thickness thereof increases from the directional deformation portion side to the support portion side.

16. A pointing device according to claim 10, wherein the magnet comprises one of an annular magnet and a plurality of magnet pieces that are disposed at annular positions, and wherein the magnet is magnetized radially inwards and outwards.

17. A pointing device according to claim 10, wherein the magnet comprises a plastic magnet.

18. A pointing device according to claim 10, wherein the support portion has a magnet accommodating recess portion formed therein, and wherein the pointing device further comprises a key top for blocking the magnet accommodating recess portion, the key top being mounted to the front face of the support portion.

19. A pointing device according to claim 18, wherein the base sheet is formed of a translucent rubber-like elastic body, wherein the key top is formed of a translucent resin having a main body portion and a flange portion provided at a lower end of the main body portion, and wherein the magnet accommodating recess portion is formed at a position facing the flange portion in the support portion.

20. A pointing device according to claim 10, wherein the support portion is formed as a thin support portion having a penetration hole, wherein the pointing device further comprises an upper key top and a lower key top that sandwich a front face and a reverse face of the support portion by firm fixation through the penetration hole, and wherein the magnet accommodating recess portion is formed in the lower key top.

* * * * *

UNITED STATES PATENT AND TRADEMARK OFFICE
CERTIFICATE OF CORRECTION

PATENT NO. : 7,508,376 B2 Page 1 of 1
APPLICATION NO. : 11/138436
DATED : March 24, 2009
INVENTOR(S) : Toshinori Takatsuka et al.

It is certified that error appears in the above-identified patent and that said Letters Patent is hereby corrected as shown below:

Title page Item (73) should read:

Assignee: Asahi Kasei Electronics Co., Ltd., Tokyo (JP)
Polymatech Co., Ltd., Tokyo (JP)

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,508,376 B2
APPLICATION NO. : 11/138436
DATED : March 24, 2009
INVENTOR(S) : Toshinori Takatsuka et al.

It is certified that error appears in the above-identified patent and that said Letters Patent is hereby corrected as shown below:

Title Page
Please amend Item (73) as follows:

Assignee: Asahi Kasei EMD Corporation, Tokyo (JP)
Polymatech Co., Ltd., Tokyo (JP)

Signed and Sealed this

Second Day of November, 2010

David J. Kappos
*Director of the United States Patent and Trademark Office*